United States Patent
Togari et al.

(10) Patent No.: US 11,695,644 B2
(45) Date of Patent: Jul. 4, 2023

(54) COMMUNICATION MANAGEMENT APPARATUS AND COMMUNICATION MANAGEMENT METHOD

(71) Applicant: Nippon Telegraph and Telephone Corporation, Tokyo (JP)

(72) Inventors: Yukihiro Togari, Musashino (JP); Shingo Okada, Musashino (JP); Hisashi Kojima, Musashino (JP); Saburo Seto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/780,865

(22) PCT Filed: Dec. 3, 2019

(86) PCT No.: PCT/JP2019/047185
§ 371 (c)(1),
(2) Date: May 27, 2022

(87) PCT Pub. No.: WO2021/111516
PCT Pub. Date: Jun. 10, 2021

(65) Prior Publication Data
US 2023/0006893 A1 Jan. 5, 2023

(51) Int. Cl.
*H04L 41/147* (2022.01)
*H04L 41/0896* (2022.01)
(Continued)

(52) U.S. Cl.
CPC ........ *H04L 41/147* (2013.01); *H04L 41/0896* (2013.01); *H04L 41/5006* (2013.01); *H04L 47/2483* (2013.01); *G06F 2209/5019* (2013.01)

(58) Field of Classification Search
CPC ............ H04L 67/1029; H04L 67/1008; G06F 9/5088
See application file for complete search history.

(56) References Cited

U.S. PATENT DOCUMENTS

2018/0109464 A1* 4/2018 Chen .................. G06F 11/3442
2019/0253490 A1 8/2019 Du et al.
2022/0353201 A1* 11/2022 Navali ................. H04L 47/125

OTHER PUBLICATIONS

Togari et al., "Examination of traffic distribution method in cloud-native service platform," 20th Network Software Study Group, Oct. 25, 2019, pp. 1-17, 35 pages (with English Translation).

(Continued)

*Primary Examiner* — Bryan Y Lee
(74) *Attorney, Agent, or Firm* — Fish & Richardson P.C.

(57) ABSTRACT

A communication management apparatus suppresses occurrence of a communication anomaly in a cluster by including: an acquisition unit acquiring quantities of traffic of communications performed by one or more communication units operating in each of a plurality of computers constituting a cluster; a prediction unit predicting future quantities of traffic of the communications; an identification unit calculating, for each of the computers, a total of the future quantities of traffic of the communication units operating in the computer and identifying a first computer for which the total exceeds a threshold; and a move control unit controlling, for a communication unit operating in the first computer, move to a second computer.

9 Claims, 25 Drawing Sheets

(51) Int. Cl.
    *H04L 41/5006* (2022.01)
    *H04L 47/2483* (2022.01)

(56) References Cited

OTHER PUBLICATIONS

Xu et al., "NBWGuard: Realizing Network QoS for Kubernetes," 19th International Middleware Conference Industry (Middleware '18 Industry), Dec. 10, 2018, pp. 32-38.

* cited by examiner

Fig. 18

| ITEM | CONTENT OF SETTING |
|---|---|
| LIST OF WORKLOADS THE QUANTITIES OF TRAFFIC OF WHICH ARE TO BE ACQUIRED | <WORKLOADS A, B, ...> |
| ALGORITHM USED TO PREDICT COMMUNICATION WITH OUTSIDE OF CLUSTER | ARIMA MODEL |
| LEARNING PARAMETER USED TO PREDICT COMMUNICATION OF WORKLOAD A WITH OUTSIDE OF CLUSTER | $(p, d, q) = (5, 1, 2)$ |
| ... | ... |
| ALGORITHM USED TO PREDICT COMMUNICATION WITH WORKLOAD INSIDE CLUSTER | RNN |
| LEARNING PARAMETER USED TO PREDICT COMMUNICATION OF WORKLOAD A WITH INSIDE OF CLUSTER | $(\alpha, \beta) = (1, 3)$ |
| ... | ... |
| POLICY INFORMATION ABOUT COMMUNICATION OF WORKLOAD A WITH INSIDE OF CLUSTER | DISTRIBUTION OF LOAD TO WORKLOADS OF BACK END SERVICE |
| ... | ... |

Fig. 19

| ITEM | CONTENT OF SETTING |
|---|---|
| BANDWIDTH OF SERVER 1 | 10Gbps |
| BUFFER OF SERVER 1 | 0.5Gbps |
| ... | ... |
| ALLOWABLE USE RATE | 90% |

| ITEM | CONTENT OF SETTING |
|---|---|
| ID'S OF WORKLOADS OPERATING IN SERVER 1 | A, B, J |
| METRICS OF SERVER 1 | CPU: 20%<br>MEMORY: 40%<br>STORAGE: 10%<br>QUANTITY OF TRAFFIC: 11 Gbps |
| ID'S OF WORKLOADS OPERATING IN SERVER 2 | C, E |
| METRICS OF SERVER 2 | CPU: 20%<br>MEMORY: 40%<br>STORAGE: 10%<br>QUANTITY OF TRAFFIC: 8 Gbps |
| ... | ... |

Fig. 23

| SERVICE NAME | ITEM | QoS SETTING INFORMATION |
|---|---|---|
| FRONT END SERVICE | WORKLOAD A | Guaranteed |
| | WORKLOAD B | Guaranteed |
| BACK END SERVICE | WORKLOAD C | Best Effort |
| ... | ... | ... |

233

COMMUNICATION MANAGEMENT APPARATUS AND COMMUNICATION MANAGEMENT METHOD

CROSS-REFERENCE TO RELATED APPLICATIONS

This application is a National Stage application under 35 U.S.C. § 371 of International Application No. PCT/JP2019/047185, having an International Filing Date of Dec. 3, 2019. The disclosure of the prior application is considered part of the disclosure of this application, and is incorporated in its entirety into this application.

TECHNICAL FIELD

The present invention relates to a communication management apparatus and a communication management method.

BACKGROUND ART

In services such as AR (augmented reality), VR (virtual reality) and remote maintenance, such high communication quality that packet loss and delay are minimized is required end-to-end. For example, Non-Patent Literature 1 discloses that, in a situation in which such services are operating on a cloud-native foundation (such as Kubernetes) constructed in a cluster, communication is enabled without causing occurrence of queuing delay, by separating pods, which are minimum units to manage containers in Kubernetes, into a plurality of priority classes and assigning bandwidths to the pods in descending order from the highest class pod.

CITATION LIST

Non-Patent Literature

Non-Patent Literature 1: NBWGuard: Realizing Network QoS for Kubernetes, 2018.

SUMMARY OF THE INVENTION

Technical Problem

In services requiring low delay in end-to-end communication, communication with an end-user terminal outside a cluster and communication between microservices essential for processing of an application should be low-delay. In the technique of Non-Patent Literature 1, however, there is a problem that delay occurs when multiplexing or bursting of high-priority communications occurs.

The present invention has been made in view of the above point, and an object is to suppress occurrence of a communication anomaly in a cluster.

Means for Solving the Problem

Therefore, in order to solve the above problem, a communication management apparatus includes: an acquisition unit acquiring quantities of traffic of communications performed by one or more communication units operating in each of a plurality of computers constituting a cluster; a prediction unit predicting future quantities of traffic of the communications; an identification unit calculating, for each of the computers, a total of the future quantities of traffic of the communication units operating in the computer and identifying a first computer for which the total exceeds a threshold; and a move control unit controlling, for a communication unit operating in the first computer, move to a second computer.

Effects of the Invention

It is possible to suppress occurrence of a communication anomaly in a cluster.

BRIEF DESCRIPTION OF DRAWINGS

FIG. 18 is a diagram showing a configuration example of a prediction parameter management table 214.

FIG. 19 is a diagram showing a configuration example of a threshold information table 215.

FIG. 21 is a diagram showing a configuration example of a cluster management table 222.

FIG. 23 is a diagram showing a configuration example of a QoS setting information table 233.

DESCRIPTION OF EMBODIMENT

An embodiment of the present invention will be explained below based on drawings. The explanation will be made below on the assumption of an environment in which a process (a container) that realizes a service on a cloud-native foundation, such as Kubernetes, constructed in a cluster is executed.

Figure 1:
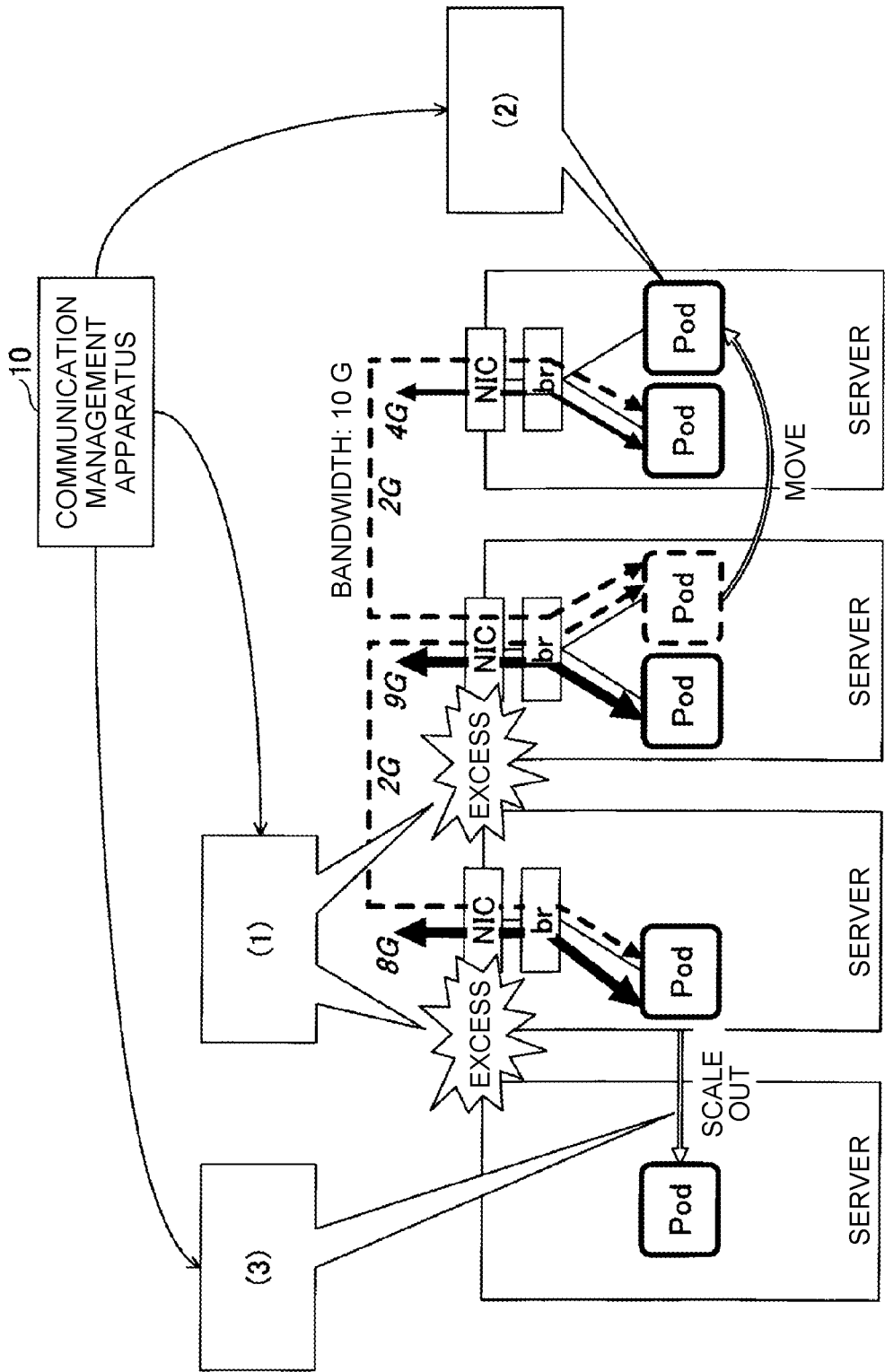
FIG. 1 is a diagram for illustrating an outline of an embodiment of the present invention.

FIG. 1 is a diagram for illustrating an outline of an embodiment of the present invention. In FIG. 1, a state in which one or more pods are operating in each of servers which are four physical hosts (physical computers) constituting a cluster is shown. Each solid-line two-directional arrow indicates communication with the outside of the cluster (outside the cluster), and each broken-line two-directional arrow indicates communication between microservices (communication between pods inside the cluster) (the same goes for the other drawings). A pod refers to a minimum unit to manage a set of containers (processes). In FIG. 1, it is shown that a communication management apparatus 10, which is a computer to manage the cluster, executes procedures (1), (2) and (3). The procedures means the following:

(1) to identify a server with a relatively high probability of exceeding a bandwidth by predicting the quantity of traffic of each pod;
(2) to select a pod to be moved and a move destination server in a manner that the quantity of traffic is distributed among the servers; and
(3) at (2), to, after scaling out (dividing) the pod into a plurality of pieces and distributing the quantity of traffic among the pods, re-execute the procedure of and after (2), if there is not a server that satisfies conditions as a move destination.

After the pod moves, the communication management apparatus 10 dynamically performs QoS setting for communication of the pod according to a communication quality request on the service side.

Figure 2:
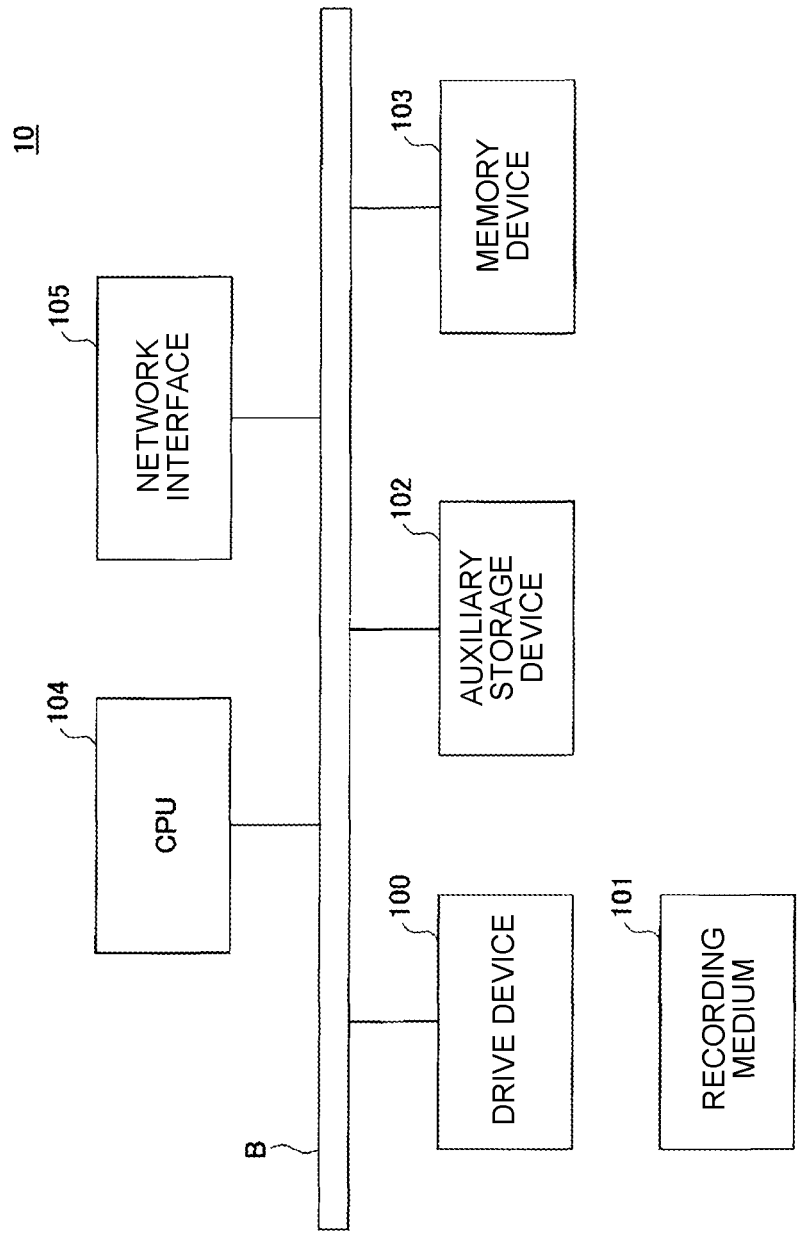
FIG. 2 is a diagram showing a hardware configuration example of a communication management apparatus 10 in the embodiment of the present invention.

FIG. 2 is a diagram showing a hardware configuration example of the communication management apparatus 10 in the embodiment of the present invention. The communication management apparatus 10 in FIG. 2 includes a drive device 100, an auxiliary storage device 102, a memory device 103, a CPU 104, a network interface 105 and the like that are mutually connected via a bus B.

A program that realizes a process in the communication management apparatus 10 is provided by a recording medium 101 such as a CD-ROM. When the recording medium 101 that stores the program is set in the drive device 100, the program is installed into the auxiliary storage device 102 from the recording medium 101 via the drive device 100. Installation of the program, however, does not necessarily have to be performed by the recording medium 101 but may be performed by downloading from another computer via a network. The auxiliary storage device 102 stores the installed program and also stores necessary files, data and the like.

When an instruction to launch the program is given, the memory device 103 reads the program from the auxiliary storage device 102 and stores the program. The CPU 104 executes functions related to the communication management apparatus 10 according to the program stored in the memory device 103. The network interface 105 is used as an interface to connect to the network.

Figure 3:
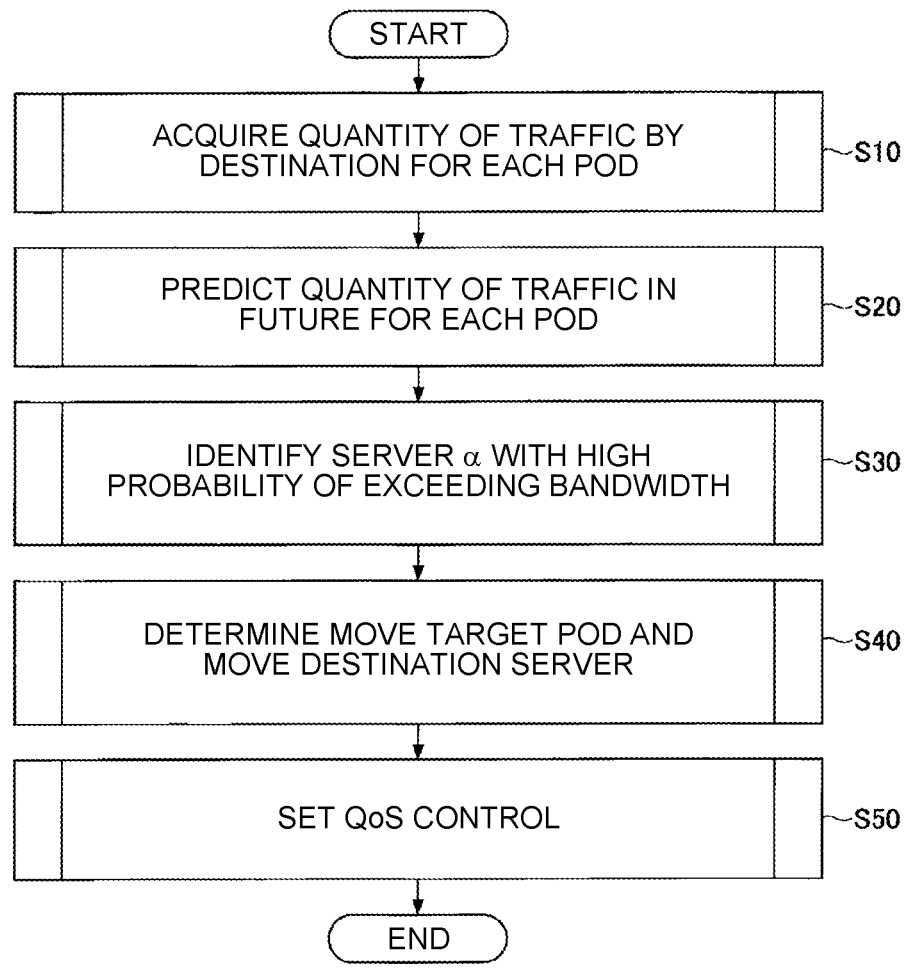
FIG. 3 is a flowchart for illustrating an example of a processing procedure executed by the communication management apparatus 10.

FIG. 3 is a flowchart for illustrating an example of a processing procedure executed by the communication management apparatus 10. The one or more programs installed in the communication management apparatus 10 cause the communication management apparatus 10 to execute each of steps in FIG. 3.

At step S10, the communication management apparatus 10 acquires the quantity of traffic by destination for each pod that is operating in each server inside the cluster. Here, "by destination" refers to whether the destination is outside or inside the cluster. As for communication inside the cluster, the quantity of traffic is distinguished by communication partner. On the other hand, as for the quantity of traffic of communication with the outside of the cluster, communication partners are not distinguished. Therefore, the quantity of traffic of communication with the outside of the cluster is one for each pod at the most.

Next, the communication management apparatus 10 predicts the quantity of traffic in the future (for example, after N minutes) for each pod (calculates a predicted value of the quantity of traffic) (S20).

Next, the communication management apparatus 10 calculates a predicted value of the quantity of traffic of each server based on the predicted value of the quantity of traffic of each pod, and identifies a server α with a relatively high probability of exceeding a bandwidth based on the predicted value of the quantity of traffic of each server (S30).

Next, the communication management apparatus 10 determines a move target pod from among pods operating in the server α, determines a server to be a move destination of the move target pod and moves the pod to the server (S40). The move target pod and the move destination are determined in a manner that the quantity of traffic among the servers is distributed as equally as possible on the assumption of change in the quantity of traffic in the future. As a result, the quantity of traffic can be distributed among the servers.

Next, the communication management apparatus 10 dynamically sets QoS control for the newly scheduled (moved) pod (S50). That is, after scheduling (moving) the pod, QoS control is performed for pods of priority services for which communication quality is especially to be guaranteed.

Figure 4:
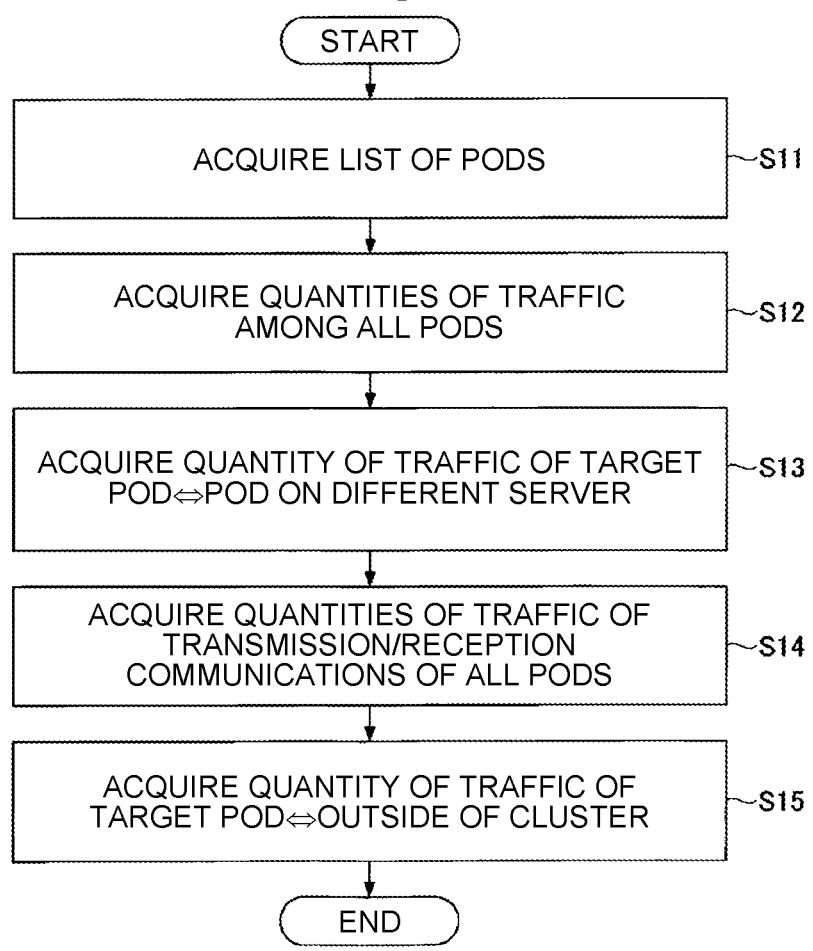
FIG. 4 is a flowchart for illustrating an example of a processing procedure of a process for acquiring the quantity of traffic by destination for each pod.
Figure 5:
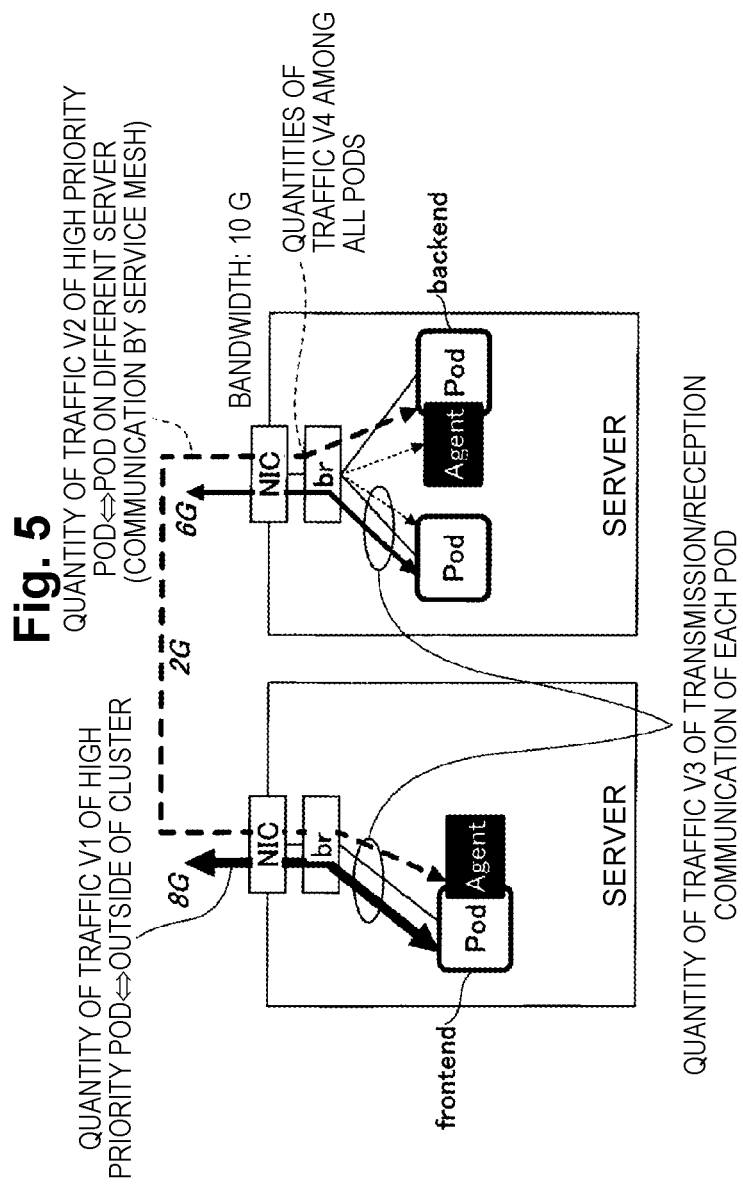
FIG. 5 is a diagram for illustrating the process for acquiring the quantity of traffic by destination for each pod.

Next, details of step S10 will be explained. FIG. 4 is a flowchart for illustrating an example of a processing procedure of a process for acquiring the quantity of traffic by destination for each pod. FIG. 5 is a diagram for illustrating the process for acquiring the quantity of traffic by destination for each pod.

At step S11, the communication management apparatus 11 acquires a list of pods to be targeted for acquisition of the quantity of traffic (hereinafter referred to as "a pod list"). The pod list is list information about a part of the pods the quantities of traffic of which are desired to be managed (that is, a part of the pods with relatively high communication priority) and is, for example, created in advance. In the case of desiring to manage the quantities of traffic of all the pods, however, the pod list may be list information about all the pods. In the pod list, identification information about each pod is, for example, an IP address, a service name or the like. Hereinafter, each pod included in the pod list will be referred to as "a target pod".

Next, the communication management apparatus 10 acquires a quantity of traffic V4 (see FIG. 5) for each of communications among all the pods (hereinafter referred to as "communications c4") from telemetry information about a function of relaying inter-pod communication (example: Envoy proxy) (S12). Here, all the pods refers to all the pods including pods other than the target pods. At step S12, for each of the communications c4, pods to be end points of the communication c4 is identified in addition to the quantity of traffic V4.

Next, the communication management apparatus 10 identifies such communications that target pods are end points and that they are not communications inside the same server, among the communications c4 (that is, communications of the target pods⇔pods on different servers (hereinafter referred to as "communications c2")) and acquires, for each of the target pods, a quantity of traffic V2 (see FIG. 5) of each communication c2 related to the target pod (an end point of which is the target pod) (S13).

Next, the communication management apparatus 10 acquires quantities of traffic V3 (see FIG. 5) of transmission/reception communications of all the pods (hereinafter referred to as "communications c3") from management information about a container integration function (for example, Docker) (S14).

Next, for each target pod, the communication management apparatus 10 acquires a quantity of traffic V1 of communication of the target pod⇔the outside of the cluster (hereinafter referred to as "communication c1") by subtracting the quantity of traffic V4 from the quantity of traffic V3 of the target pod (S15).

By the above, for each target pod, one quantity of traffic V1 and one or more quantities of traffic V2 by communication c2 (by communication partner's pod) are acquired.

Figure 6:
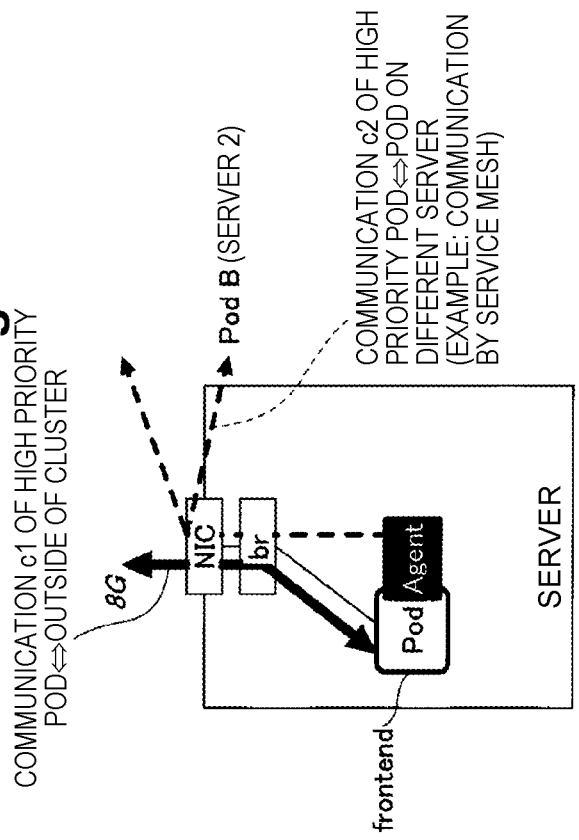
FIG. 6 is a diagram showing an example of communication of each pod.

Next, details of step S20 in FIG. 3 will be explained. FIG. 6 is a diagram showing an example of communication of each pod. In FIG. 6, an example of the communications c1 and c2 acquired at step S10 is shown. In the present embodiment, in order to improve prediction accuracy, the communication management apparatus 10 performs prediction for the communications c1 and c2 by different methods at step S20.

Figure 7:
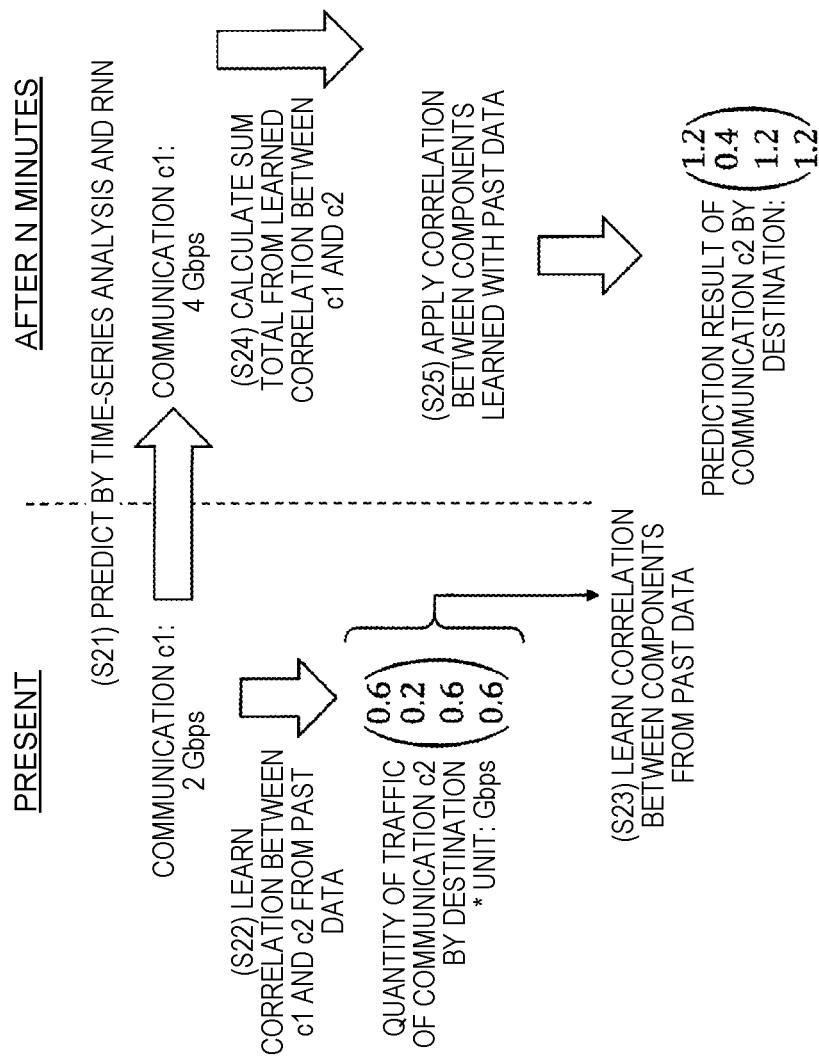
FIG. 7 is a diagram for illustrating a process for predicting a future quantity of traffic of each pod.

FIG. 7 is a diagram for illustrating a process for predicting a future quantity of traffic of each pod. In FIG. 7, for each of the communication c1 and the communications c2 related to certain one target pod (hereinafter referred to as "a target pod p"), the current quantity of traffic is shown on the left side, and a predicted value of the quantity of traffic in the future (after N minutes) is shown on the right side. That is, the process explained below is executed for each target pod.

First, for the communication c1 of the target pod p, the communication management apparatus 10 predicts the future quantity of traffic using a publicly known technique such as time-series analysis ("Kawahara, Application of AI to Network Operation, 2018, https://www.jstage.jst.go.jp/article/bplus/12/1/12_29/_article/-char/ja/" and RNN ("Ida, Advanced Learning Technologies for Deep Learning, 2018, https://www.ntt.co.jp/journal/1806/files/JN20180630.pdf") (S21).

Meanwhile, for each of communications c2 of the target pod p, the communication management apparatus 10 learns a prediction model in consideration of correlation with a prediction result of the quantity of traffic V1, policy information about inter-pod communication, characteristics of a communication protocol and the like, and predicts the future quantity of traffic based on the prediction model.

For example, the communication management apparatus 10 learns a correlation relationship between the quantity of traffic of the communication c1 and a sum total of components of a vector v2 of the quantities of traffic of the communications c2 based on past data (a communication history in the past) (S22). Here, components of the vector v2 are the quantities of traffic of the communications c2 by communication partner. The communications c2 are communications to transfer processing of the communication c1 received by the target pod p to other pods according to a value of a request header and a load distribution weight, and the quantity of traffic of each flow is fixed because "grpc" is used as a protocol. Therefore, it is thought that there is a correlation relationship between the quantity of traffic of the communication c1 and a sum total of the quantities of traffic of the communications c2.

Further, for the target pod p, the communication management apparatus 10 learns a correlation relationship between the components of the vector v2 based on past data (S23).

Next, for the target pod p, the communication management apparatus 10 applies a predicted value of the communication c1 to the learned correlation relationship between the quantity of traffic of the communication c1 and the sum total of the components of the vector v2 of the quantities of traffic of the communications c2 to calculate a predicted value of the sum total (S24).

Next, for the noticed pod, the communication management apparatus 10 applies the predicted value of the sum total to a correlation relationship between the sum total and the learned correlation relationship between the components of the vector 2 to calculate a predicted value of the future quantities of traffic of the communications c2 (S25).

FIG. 7 shows a simplified example in which the quantity of traffic of the communication c1=the sum total of the components of the vector v2 is satisfied, and the correlation between the components of the vector v2 is fixed. in this case, values of the components of the vector v2 are linearly proportional to the quantities of traffic of the communications c2.

Figure 8:
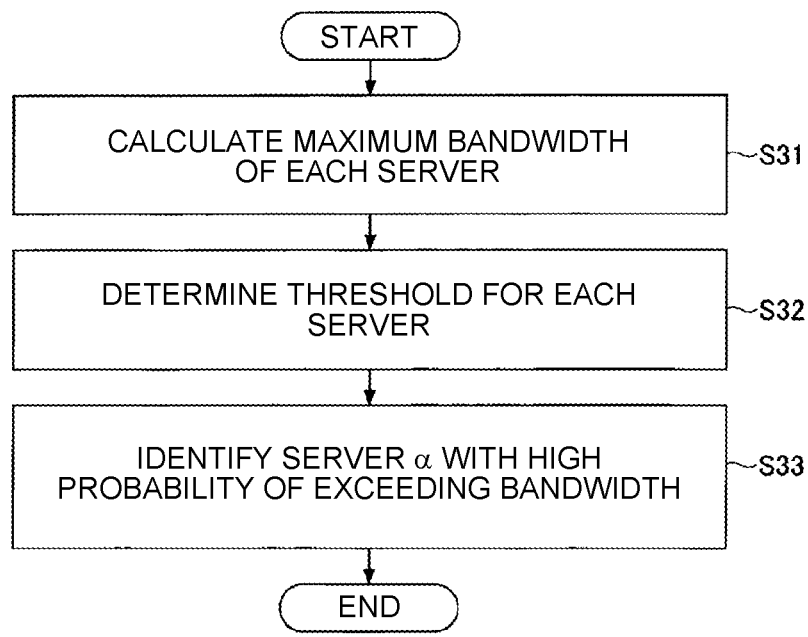
FIG. 8 is a flowchart for illustrating an example of a processing procedure of a process for identifying a server α with a high probability of exceeding a bandwidth.

Next, details of step S30 in FIG. 3 will be explained. FIG. 8 is a flowchart for illustrating an example of a processing procedure of a process for identifying the server α with a high probability of exceeding a bandwidth.

At step S31, the communication management apparatus 10 calculates a maximum bandwidth of each server based on a link bandwidth to connect to the server, a buffer value and the like. Next, the communication management apparatus 10 determines (calculates) a threshold based on the maximum bandwidth and an allowable use rate (S32). The allowable use rate is a value set in advance.

Figure 9:
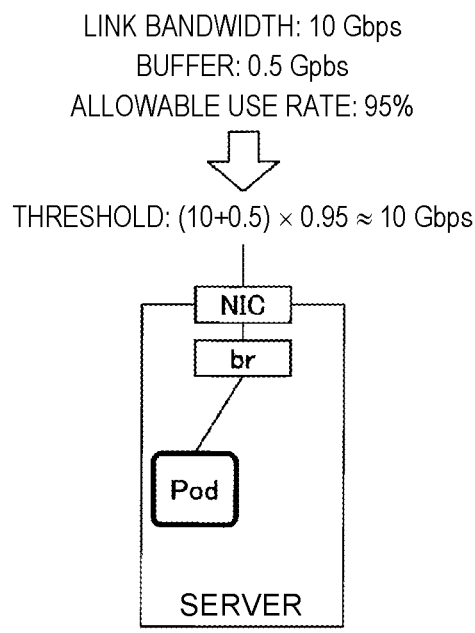
FIG. 9 is a diagram showing an example of calculation of a threshold.

FIG. 9 is a diagram showing an example of calculation of the threshold. FIG. 9 shows an example of a server with a link bandwidth of 10 Gbps, a buffer of 0.5 Gbps and an allowable use rate of 95%. In this case, the threshold for the server is determined as 10 Gbps as shown in FIG. 9. The threshold, however, may be fixedly set for each server.

Next, for each server, the communication management apparatus 10 compares a total of predicted values of communications c1 and c2 of pods belonging to the server with a threshold for the server, and identifies such a server α that the total is larger than the threshold (S31). At this time, a plurality of servers can be identified as servers α.

In a case where the target pods are a part of all the pods, the total of the predicted values is not necessarily the total of the quantities of traffic by the servers. Therefore, the allowable use rate may be set in consideration of such a situation. That is, a rate of the quantity of traffic allowed for communication of the target pods relative to the total of the quantities of traffic of the servers may be set as the allowable use rate.

Figure 10:
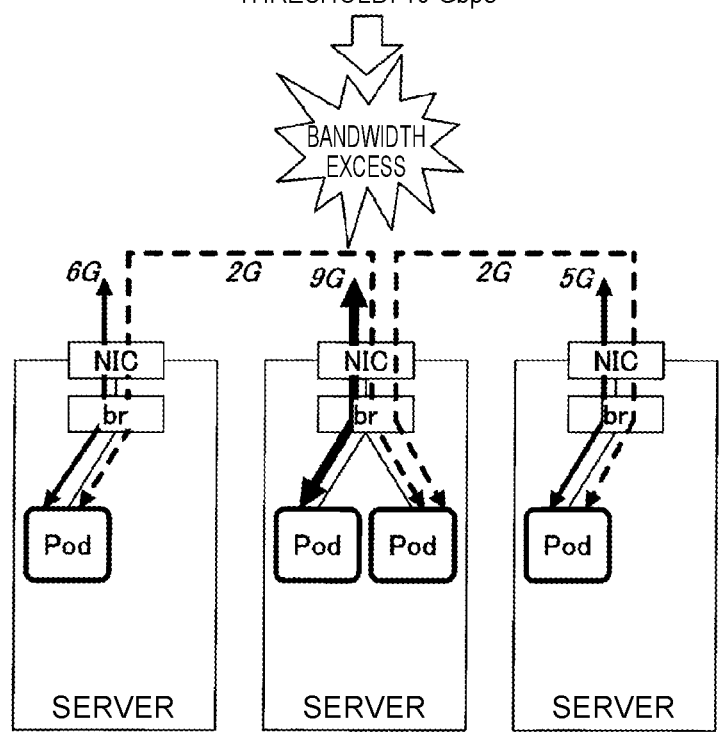
FIG. 10 is a diagram showing an example of identifying the server α.

FIG. 10 is a diagram showing an example of identifying the server α. In the example in FIG. 10, the server in the middle is identified as the server α.

Figure 11:
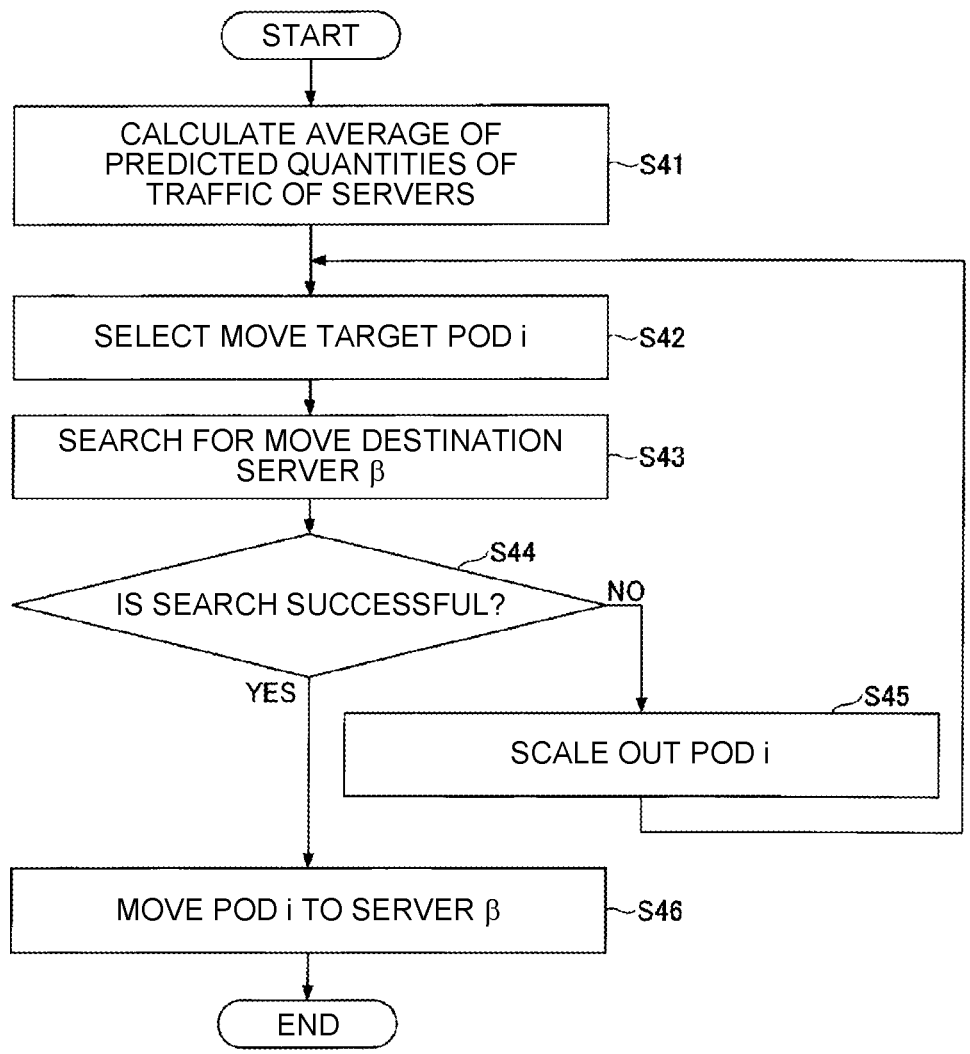
FIG. 11 is a flowchart for illustrating an example of a processing procedure of a process for determining a move target pod and a move destination.

Next, details of step S40 in FIG. 3 will be explained. FIG. 11 is a flowchart for illustrating an example of a processing procedure of a process for determining a move target pod and a move destination.

At step S41, the communication management apparatus 10 calculates an average T' of the predicted quantities of traffic of the servers.

Next, the communication management apparatus 10 selects a move target pod i so that the predicted quantity of traffic of the server α becomes the closest to T', by solving the following optimization problem (S42).

$$\alpha = \operatorname{argmin}_i |(T_\alpha - c_i) - T'| \qquad [\text{Math. 1}]$$

Here, $T_\alpha$ indicates the quantity of traffic of the server α, and $t_i$ indicates the quantity of traffic of the pod i.

Next, the communication management apparatus 10 searches for a move destination server β so that the predicted quantity of traffic of the move destination server β becomes the closest to T', by solving the following optimization problem (S43).

$$\beta = \operatorname{argmin}_j |(t_i + T_j - s_{ij}) - T'| \qquad [\text{Math. 2}]$$

Here, $s_{ij}$ indicates a sum total of the quantities of traffic of the pod i and (all) pods on a server j.

That is, the move target pod i and the move destination server β are determined in a manner that the quantity of traffic among the servers is distributed as equally as possible.

If the search for the server β is successful (S44: Yes), the communication management apparatus 10 controls move of the pod i to the server β (S46). That is, the communication management apparatus 10 performs control to delete the pod i from the server α and newly generate the pod i in the server β. As a result, the pod i moves to the server β. On the other hand, in the case of failing in the search for the server β (S44: No), the communication management apparatus 10 scales out the pod i into a plurality of pieces (divides the pod i into a plurality of pods) (S45) and repeats step S42 and the subsequent process after step S42.

Figure 12:
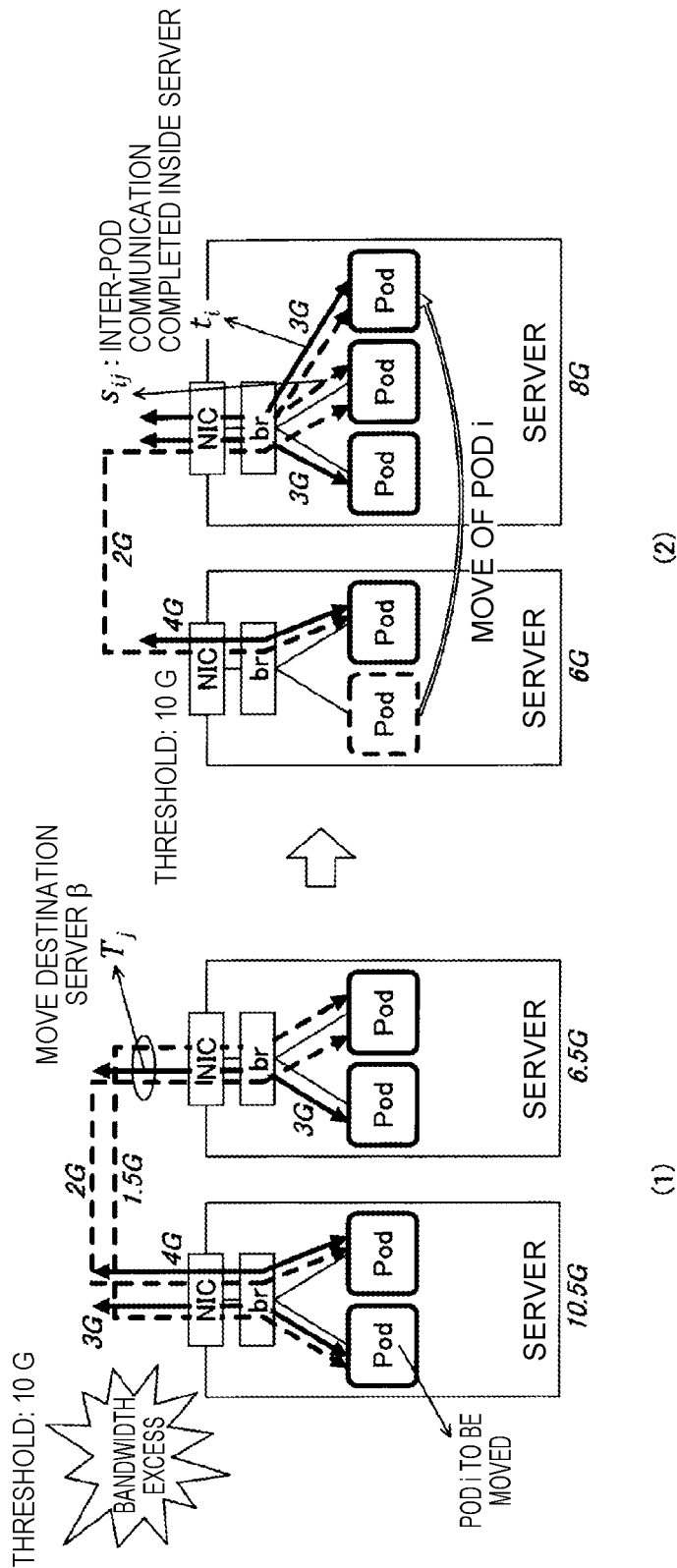
FIG. 12 is a diagram showing an example of determining the move target pod and the move destination.

FIG. 12 is a diagram showing an example of determining the move target pod and the move destination. FIG. 12 (1) shows an example in which the server on the left side has a high probability of exceeding a bandwidth (exceeding a threshold). In this case, if a pod is moved as shown in (2), it is possible to minimize difference among the predicted quantities of traffic of the servers while solving the exceeding of the bandwidth. Therefore, in this case, the pod on the left side of the server on the left side is selected as a move target, and the server on the right side is selected as a move destination.

Though an example of determining the pod i to be moved and the move destination server β based on the predicted quantity of traffic is shown above, for example, the pod i to be moved and the move destination server β may be determined, for example, based on variance of the predicted quantity of traffic. In this case, the predicted quantity of traffic in the above description can be replaced with the variance of the predicted quantities of traffic.

Figure 13:
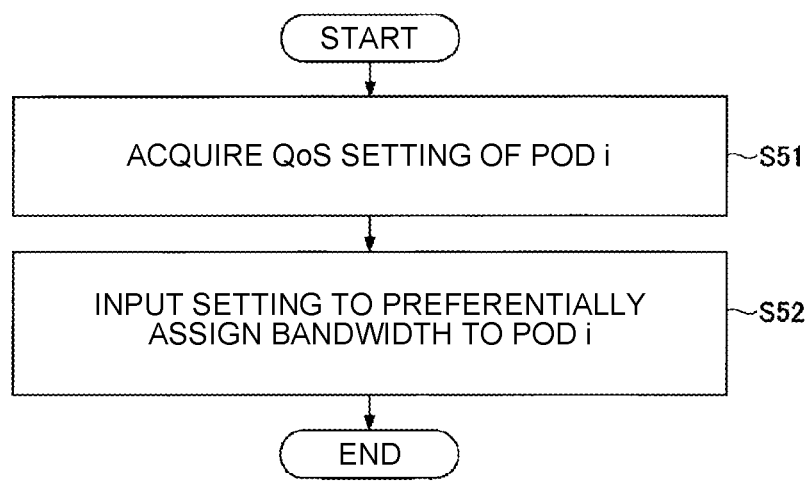
FIG. 13 is a flowchart for illustrating an example of a processing procedure of QoS control of the pod which has moved.
Figure 14:
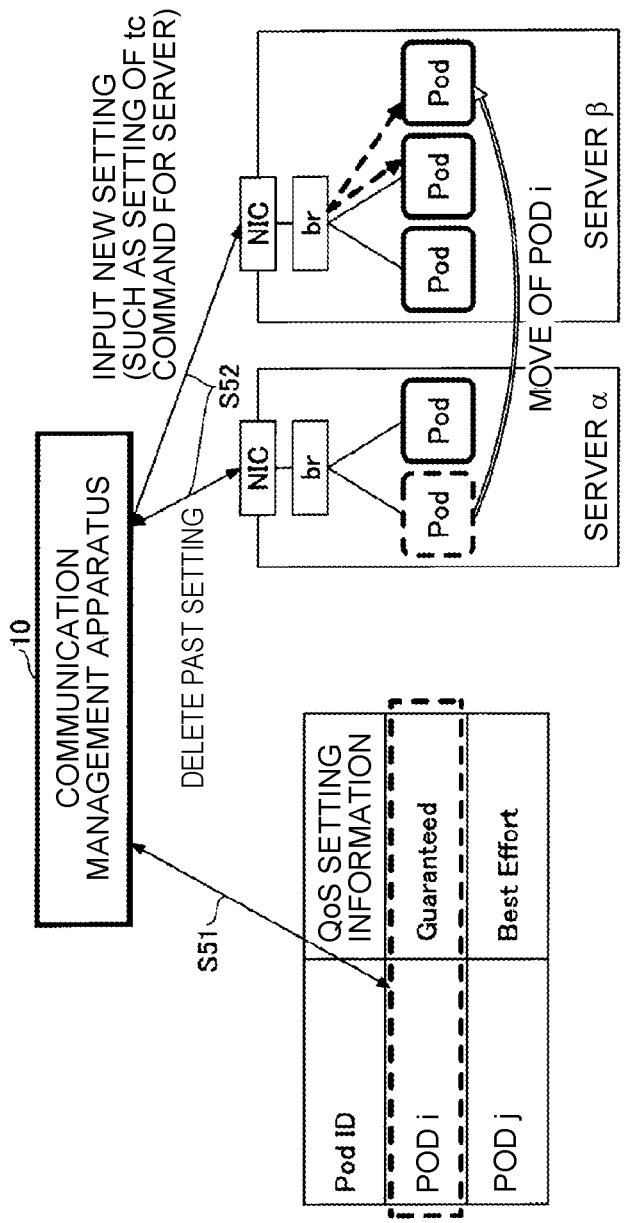
FIG. 14 is a diagram for illustrating the QoS control of the pod which has moved.

Next, details of step S50 in FIG. 3 will be explained. FIG. 13 is a flowchart for illustrating an example of a processing procedure of QoS control of a moved pod. Further, FIG. 14 is a diagram for illustrating the QoS control of the moved pod. In FIG. 14, reference signs corresponding to step numbers in FIG. 13 are given at corresponding positions.

At step S51, the communication management apparatus 10 refers to a list in which QoS control information about each pod is recorded to acquire QoS setting information for the moved pod i.

Next, the communication management apparatus 10 uses the technique of Non-Patent Literature 1 and a "tc" command to input a setting for preferentially assigning a bandwidth to the moved pod i (S52). For example, the communication management apparatus 10 deletes settings about the pod i from the server α and make settings of the "tc" command and the like for the server β.

Figure 15:
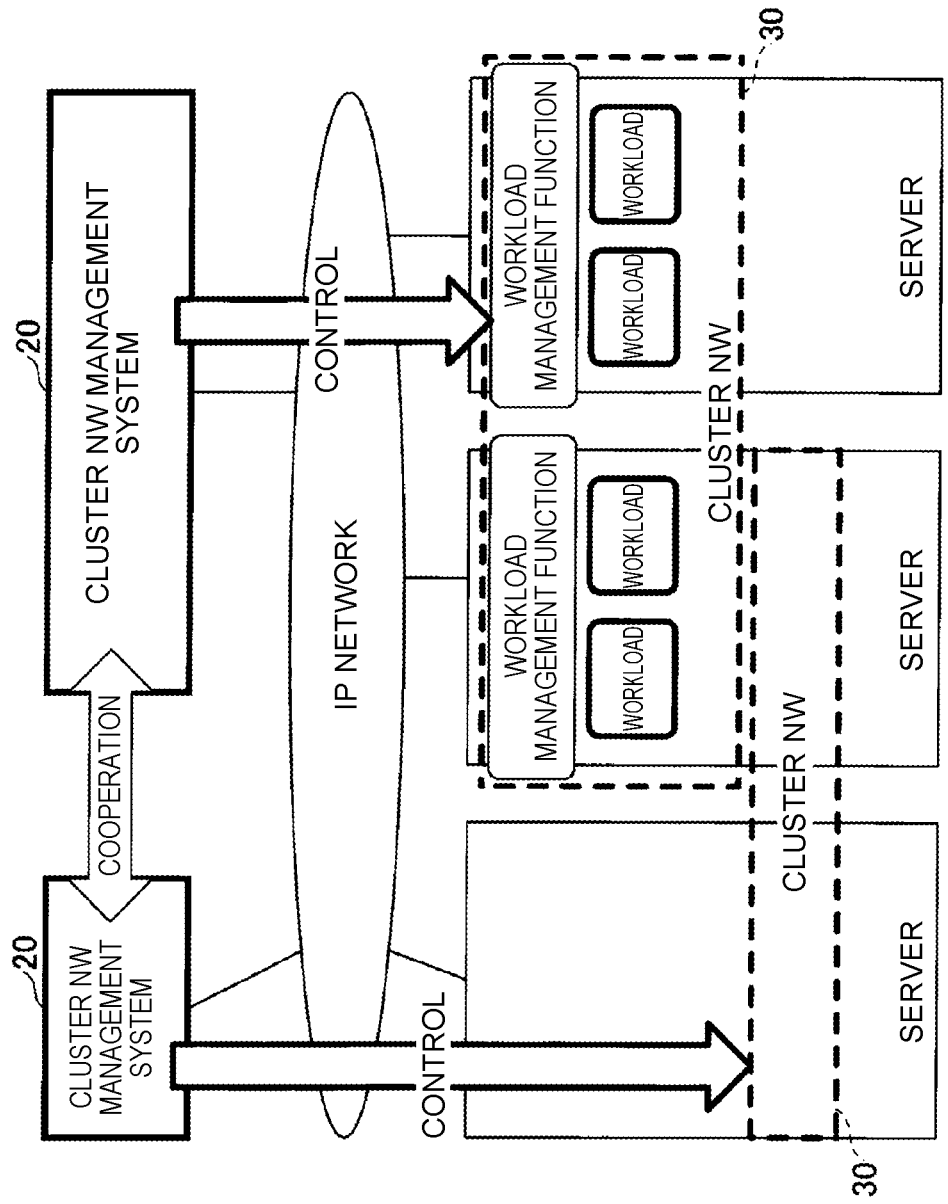
FIG. 15 is a diagram showing an example of a specific system configuration to which the embodiment of the present invention is applied.

Next, a specific system example to which the content described above is applied will be explained. FIG. 15 is a diagram showing an example of a specific system configuration to which the embodiment of the present invention is applied.

In FIG. 15, a plurality of servers, which are an example of physical hosts, are communicating via an IP network (for example, a DC fabric, a LAN or the like). Over the servers, a cluster NW 30, which is a virtual network where a workload (example: a Kubernetes pod or container) for each container is operating, is constructed for each service provider. At this time, a plurality of clusters NW 30 may exist on a single server.

Cluster NW management systems 20 are one or more computers that acquire pieces of network information such as the quantities of traffic, from workloads on the clusters NW 30 and servers belonging to the clusters NW 30, and perform position control (scheduling) of the workloads, setting for QoS control and the like based on the acquired information. That is, the cluster NW management system 20 corresponds to the communication management apparatus 10 described above. Further, the workload corresponds to the pod described above. Each cluster NW management system 20 may be located inside a server belonging to a corresponding cluster NW 30. Further, in a case where a plurality of clusters NW 30 exist on a single server, a plurality of cluster NW management systems 20 may cooperate to exchange information required for control.

Figure 16:
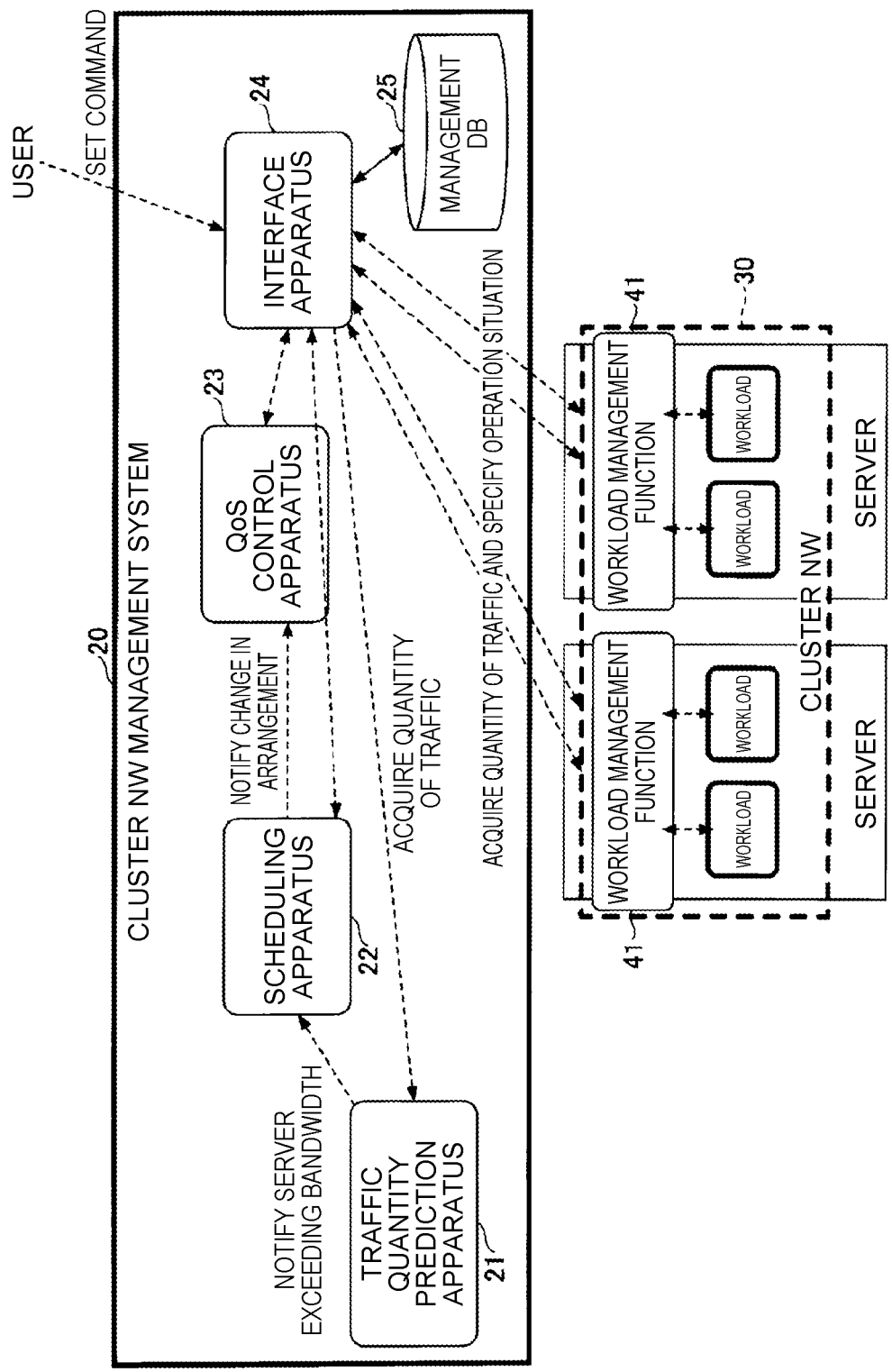
FIG. 16 is a diagram showing a configuration example of a cluster NW management system 20.

FIG. 16 is a diagram showing a configuration example of each cluster NW management system 20. In FIG. 16, the cluster NW management system 20 includes a traffic quantity prediction apparatus 21, a scheduling apparatus 22, a QoS control apparatus 23, an interface apparatus 24, a management DB 25 and the like. Each apparatus may be software or may be hardware (a computer). If each apparatus is software, the apparatuses may be realized using a common computer. In any of the cases, functions of the apparatuses are realized by processes that one or more programs installed in a computer that realizes each of the apparatuses cause the computer to execute.

The interface apparatus 24 inputs information of a command inputted from a user to the management DB 25, and directly communicates with servers and workloads, which are components of the clusters NW 30, and other internal functions to exchange telemetry and control information and the like.

The management DB 25 holds a configuration (such as the number of workloads) that a cluster should take, based on the command inputted by the user.

The traffic quantity prediction apparatus 21 acquires the quantities of traffic of workloads and servers from the interface apparatus 24 to predict the future quantities of traffic. The traffic quantity prediction apparatus 21 further calculates the quantity of traffic of each server and identifies the server α with a high probability of exceeding a bandwidth.

The scheduling apparatus 22 determines a workload to be moved from inside the server α and a move destination server.

The QoS control apparatus 23 dynamically sets QoS for the moved workload.

Further, each server includes a workload management unit 41. The workload management unit 41 accepts control communication from the interface apparatus 24 and guarantees that workloads normally operate in the server by performing launch or deletion of a workload.

Details of the traffic quantity prediction apparatus 21, the scheduling apparatus 22 and the QoS control apparatus 23 will be described below.

Figure 17:
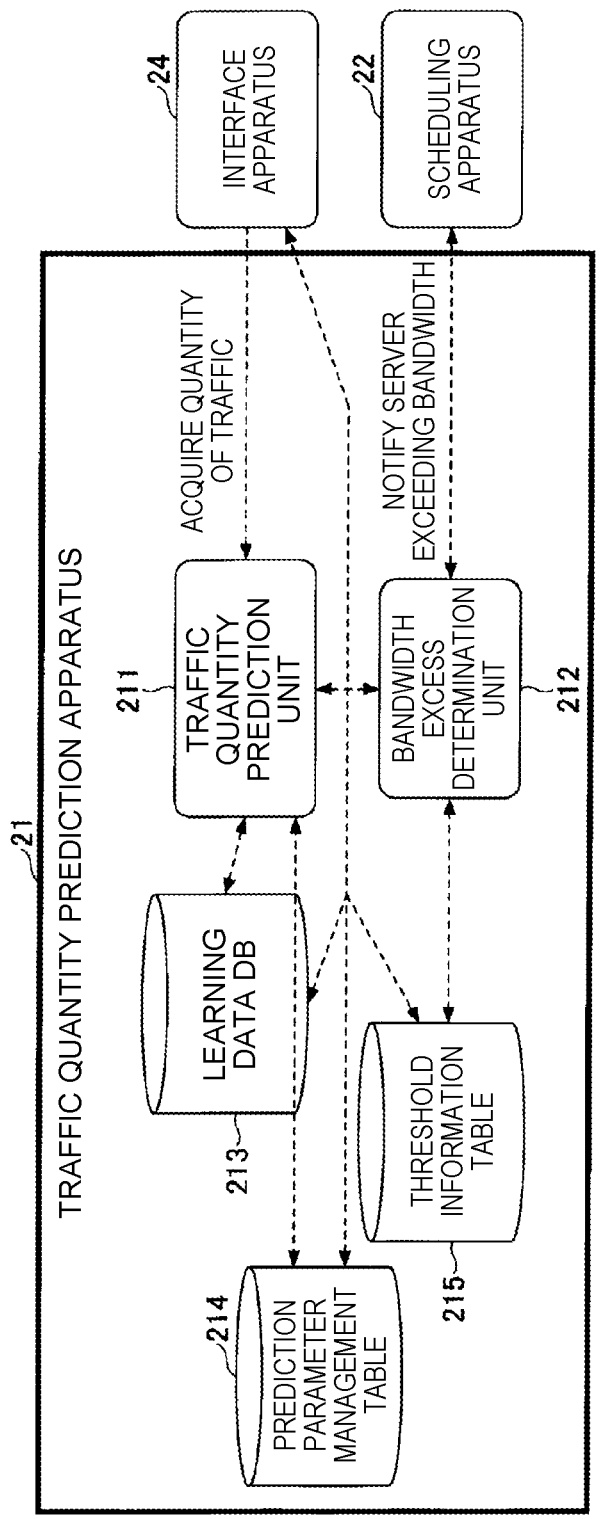
FIG. 17 is a diagram showing a configuration example of a traffic quantity prediction apparatus 21.

FIG. 17 is a diagram showing a configuration example of the traffic quantity prediction apparatus 21. In FIG. 17, the traffic quantity prediction apparatus 21 includes a traffic quantity prediction unit 211, a bandwidth excess determination unit 212, a learning data DB 213, a prediction parameter management table 214, a threshold information table 215 and the like.

The learning data DB 213 accumulates the past quantities of traffic of workloads and servers as learning data.

The prediction parameter management table 214 holds a list of workloads the quantities of traffic of which are desired to be acquired (the target pods described above). The prediction parameter management table 214 also holds algorithms used to learn a prediction model, setting information that is prior information, and parameters after learning.

The traffic quantity prediction unit 211 acquires the quantities of traffic of workloads and servers via the interface apparatus 24 and predicts the future quantities of traffic from the learning data accumulated in the learning data DB 213. The traffic quantity prediction unit 211 also updates parameters of a prediction model and stores an update result into the prediction parameter management table 214. The traffic quantity prediction unit 211 further acquires position information about workloads (which workload is located in which server) from the interface apparatus 24 and calculates the quantity of traffic of each server.

The threshold information table 215 accumulates information used to determine thresholds for bandwidths of servers.

The bandwidth excess determination unit 212 determines a threshold from a bandwidth and parameters for each server. The bandwidth excess determination unit 212 compares the threshold with the quantity of traffic of each server and identifies the server α with a high probability of exceeding a bandwidth.

FIG. 18 is a diagram showing a configuration example of the prediction parameter management table 214. As shown in FIG. 18, the prediction parameter management table 214 accumulates a list of workloads the quantities of traffic of which are to be acquired, information of an algorithm used to predict communication with the outside of a cluster and an algorithm used to predict communication with a workload inside a cluster, and learning parameters thereof. In order to predict the quantity of traffic of each workload, individual learning parameters are held for each workload. The learning parameters are learned, accompanying traffic quantity data that newly flows in, and values in the tables are also updated.

Further, in a case where how each workload communicates inside a cluster is specified by a policy, the prediction parameter management table 214 holds information thereabout. The information is used to learn a model.

FIG. 19 is a diagram showing a configuration example of the threshold information table 215. As shown in FIG. 19, the threshold information table 215 holds information for calculating a threshold used when the bandwidth excess determination unit 212 selects the server α with a high probability of exceeding a bandwidth. For example, for each server, a bandwidth for the server and a buffer value for a socket are held. The threshold information table 215 also holds an allowable use rate which is information about a use rate of a usable bandwidth relative to a maximum bandwidth.

Figure 20:
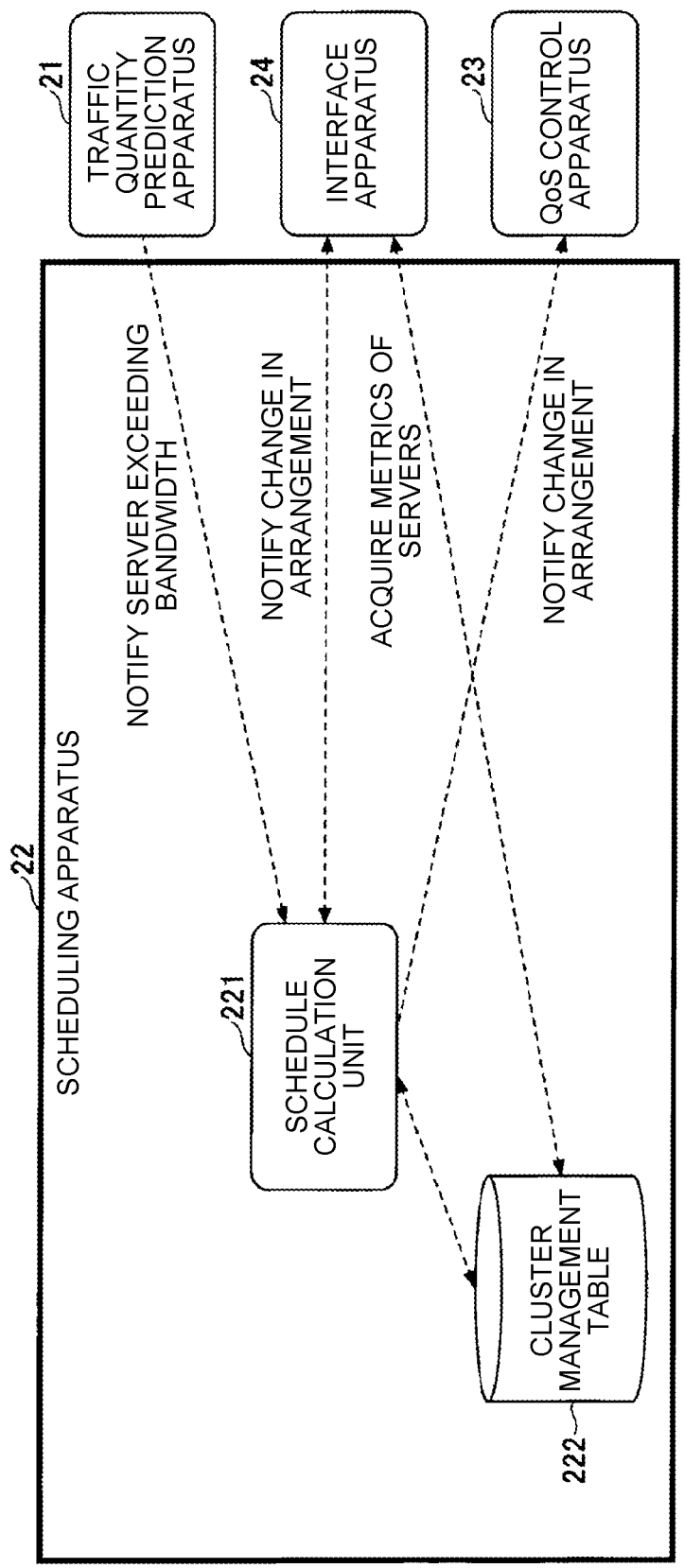
FIG. 20 is a diagram showing a configuration example of a scheduling apparatus 22.

FIG. 20 is a diagram showing a configuration example of the scheduling apparatus 22. In FIG. 20, the scheduling apparatus 22 includes a schedule calculation unit 221 a cluster management table 222 and the like.

The schedule calculation unit 221 acquires information about a server exceeding a bandwidth and traffic quantity information about workloads operating inside the server, from the traffic quantity prediction apparatus 21. The schedule calculation unit 221 also refers to the cluster management table 222 to determine a workload to be moved from the server exceeding the bandwidth. The schedule calculation unit 221 also refers to the cluster management table 222 to determine a move destination server in consideration of information about workloads operating in each server and metric information about the server. The schedule calculation unit 221 further performs control to move the workload. Specifically, the schedule calculation unit 221 makes an update request to the interface apparatus 24 and, at the same time, transmits a notification of change in arrangement to the QoS control apparatus 23 in order to change information about the move target workload and the move destination server.

The cluster management table 222 acquires IDs of workloads operating in each server, metrics (a CPU, a memory, a storage capacity and the quantity of traffic) of each server in real time via the interface apparatus 24 and holds them.

FIG. 21 is a diagram showing a configuration example of the cluster management table 222. As shown in FIG. 21, the cluster management table 222 holds the IDs of the workloads operating in each server and the metric information showing current performance of each server. The information in the table is updated based on an update request from the interface apparatus 24, at a timing when a change occurs in the cluster NW 30. The scheduling apparatus 22 especially refers to the metric information to determine an optimal move destination server not only from a viewpoint of the quantities of traffic but also from viewpoints of the CPUs, the memories and the storages.

Figure 22:
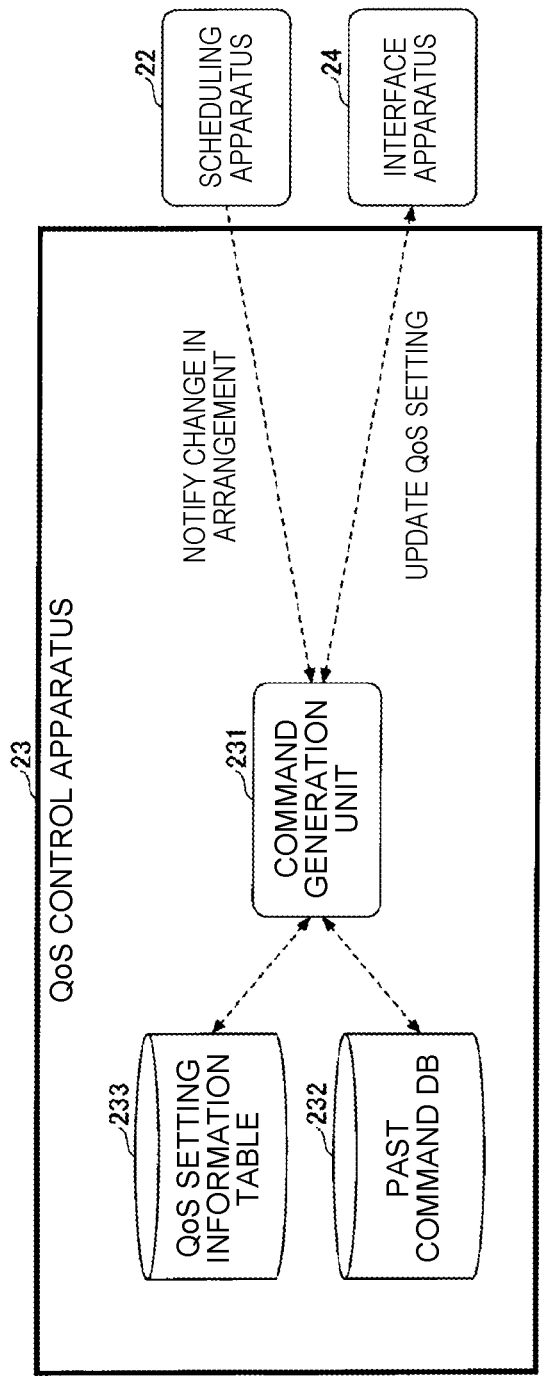
FIG. 22 is a diagram showing a configuration example of a QoS control apparatus 23.

FIG. 22 is a diagram showing a configuration example of the QoS control apparatus 23. In FIG. 22, the QoS control apparatus 23 includes a command generation unit 231, a past command DB 232, a QoS setting information table 233 and the like.

When accepting the notification of change in arrangement of workloads from the scheduling apparatus 22, the command generation unit 231 inquires of the past command DB 232 to acquire a QoS setting set in the past for the move target workload, and give an update request the QoS setting via the interface apparatus 24. The command generation unit 231 also acquires priority information about the move target workload from the QoS setting information table 233, generates a new QoS command based on the acquired information and gives the update request the QoS setting via the interface apparatus 24.

FIG. 23 is a diagram showing a configuration example of the QoS setting information table 233. As shown in FIG. 23, the QoS setting information table 233 holds QoS setting information (Guaranteed, Best Effort) according to priority of each workload. The information is specified by a system administrator at a point of time of starting a service. Since identifiers of workloads, such as IDs, names and IP addresses, are updated as necessary, a service name and QoS setting information are associated in the QoS setting information table 233.

Figure 24:
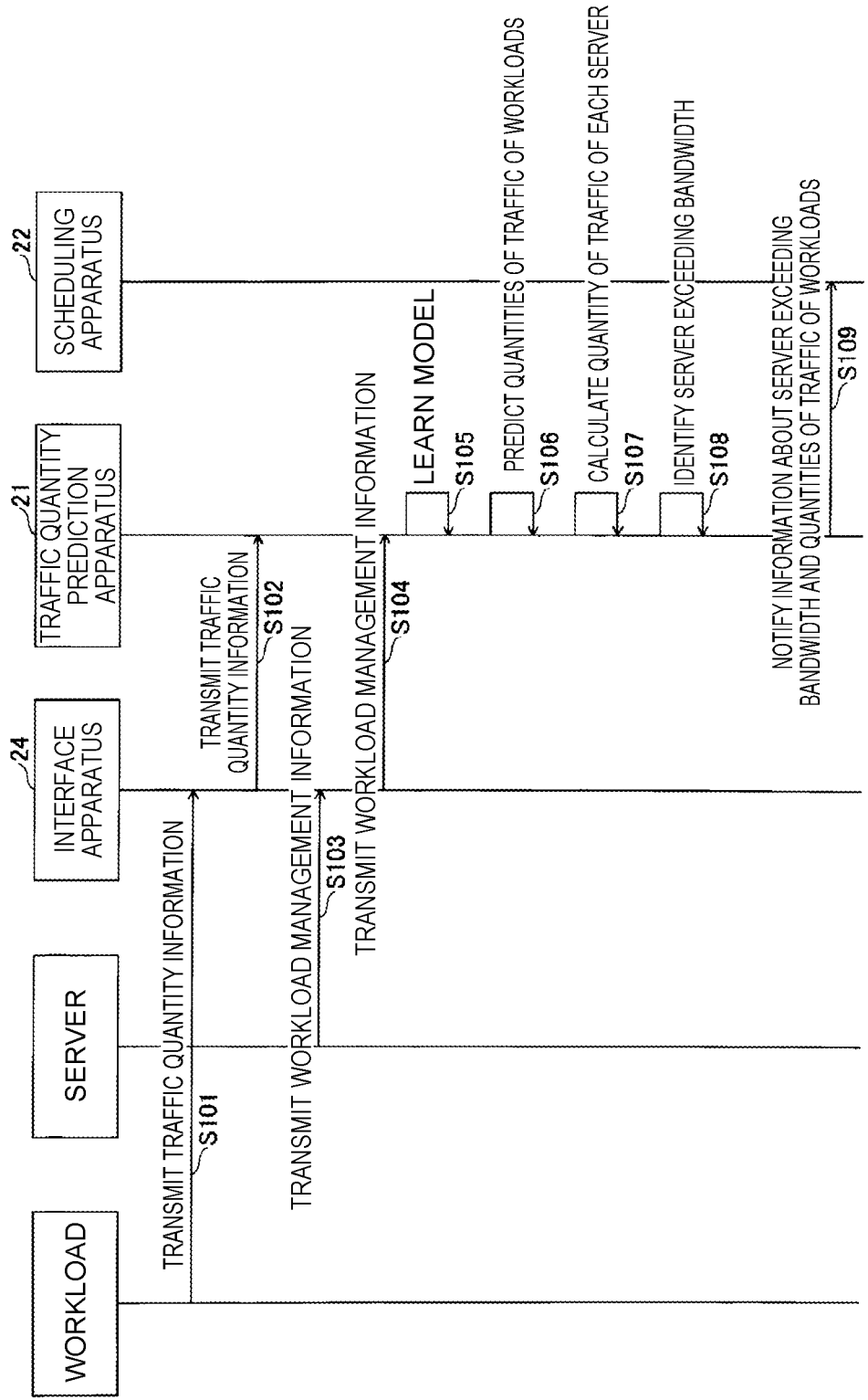
FIG. 24 is a sequence diagram for illustrating an example of a processing procedure about acquisition and prediction of traffic quantity information and prediction.

A processing procedure executed in the cluster NW management system 20 will be described below. FIG. 24 is a sequence diagram for illustrating an example of a processing procedure about acquisition of traffic quantity information and prediction. FIG. 24 shows a processing procedure executed in the cluster NW management system 20 corresponding to steps S10 to S30 in FIG. 3.

Each workload transmits traffic quantity information (information showing the current quantity of traffic) to the traffic quantity prediction apparatus 21 via the interface apparatus 24 at predetermined time intervals (S101 and S102). Each server transmits workload management information (such as information about the server in which workloads are operating) to the traffic quantity prediction apparatus 21 via the interface apparatus 24 at predetermined time intervals (S103 and S104). The traffic quantity prediction unit 211 of the traffic quantity prediction apparatus 21 records the information received via the interface apparatus 24 to the learning data DB 213.

After that, the traffic quantity prediction unit 211 learns traffic quantity data in the past recorded in the learning data DB 213 (S105) and predicts the quantity of traffic of each workload in the future (for example, after N minutes) based on a learned model (S106). Next, by totaling the predicted quantities of traffic of workloads for each server, the traffic quantity prediction unit 211 calculates the predicted quantity of traffic of the server (S107). Next, the bandwidth excess determination unit 212 of the traffic quantity prediction apparatus 21 identifies the server α with a high probability of exceeding a bandwidth based on a calculation result for each server (S108). Next, the bandwidth excess determination unit 212 transmits information about the identified server α and the predicted quantity of traffic of each workload to the scheduling apparatus 22 (S109).

Figure 25:
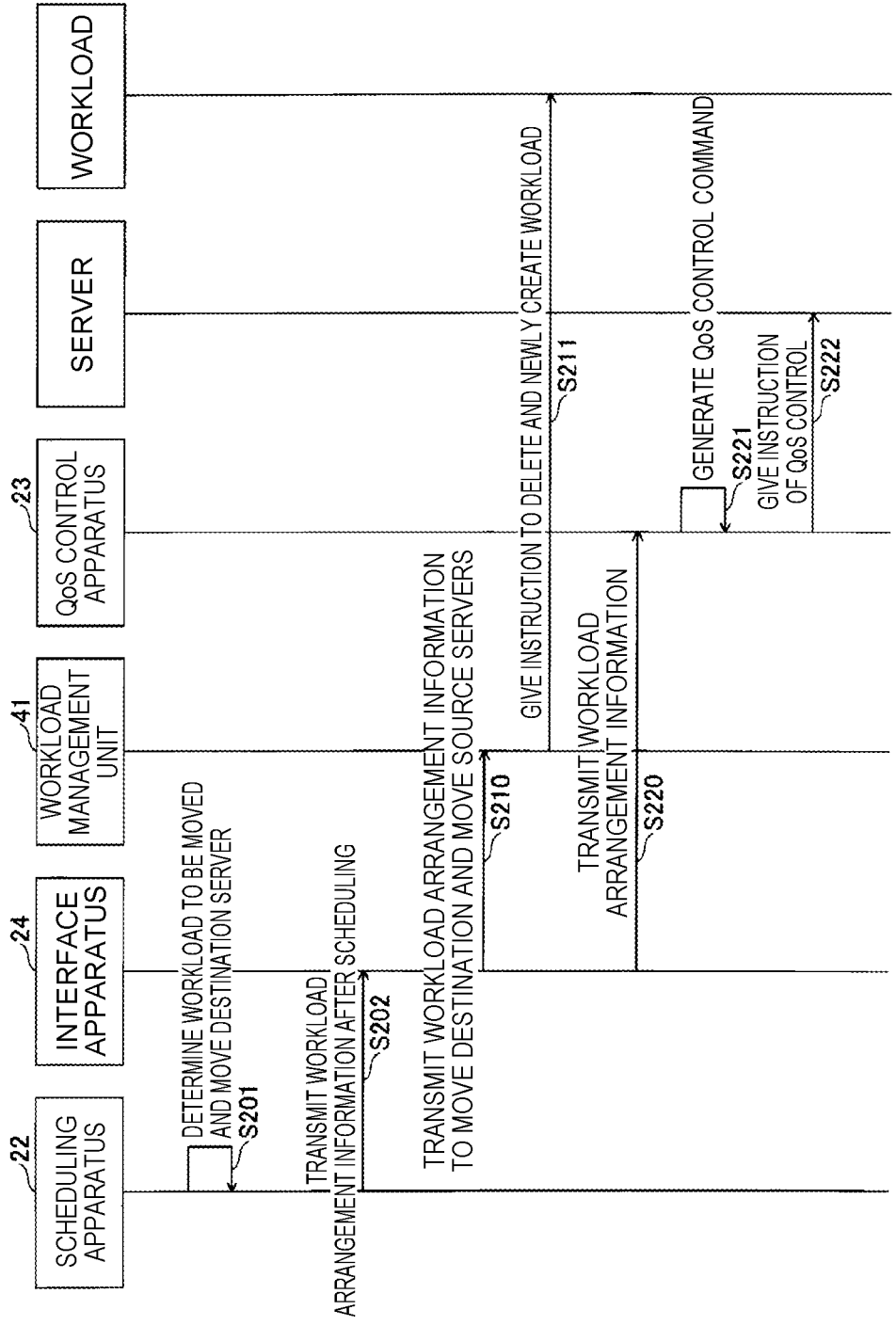
FIG. 25 is a sequence diagram for illustrating an example of a processing procedure about implementation of scheduling.

FIG. 25 is a sequence diagram for illustrating an example of a processing procedure about implementation of scheduling. FIG. 25 shows a processing procedure executed in the cluster NW management system 20, which corresponds to steps S40 and S50 in FIG. 3.

The schedule calculation unit 221 of the scheduling apparatus 22 selects a workload to be moved from among workloads operating inside the server α notified from the traffic quantity prediction apparatus 21 and determines a server to be a move destination of the workload (S201). Next, the schedule calculation unit 221 transmits the selected or determined information to the workload management unit 41 of each of the move destination server and the move source server and the QoS control apparatus 23 via the interface apparatus 24 (S202, S210 and S220).

The workload management unit 41, which is an agent of each server, performs deletion and new creation of the workload (move of the workload) according to an instruction of the scheduling apparatus 22 (based on the information transmitted from the schedule calculation unit 221) (S211).

Meanwhile, the command generation unit 231 of the QoS control apparatus 23 generates a QoS control command to be applied to the moved workload (S221) and gives an instruction of QoS control to the move destination server based on the command (S222).

As described above, according to the present embodiment, by dynamically changing the position of a pod (a workload) in consideration of the quantities of traffic of servers constituting a cluster, it is possible to prevent communication of a server from exceeding a predetermined bandwidth and reduce packet loss and delay. As a result, it is possible to suppress occurrence of a communication anomaly in the cluster.

In the present embodiment, a pod or a workload is an example of a communication unit. Servers are an example of a plurality of computers constituting a cluster. The traffic quantity prediction unit 211 is an example of an acquisition unit and a prediction unit. The bandwidth excess determination unit 212 is an example of an identification unit. The schedule calculation unit 221 is an example of a move control unit. The command generation unit 231 is an example of a QoS setting unit.

An embodiment of the present invention has been described in detail above. The present invention, however, is not limited to such a particular embodiment, and various modifications and changes are possible within a range of the spirit of the present invention described in Claims.

REFERENCE SIGNS LIST

10 Communication management apparatus
20 Cluster NW management system
21 Traffic quantity prediction apparatus
22 Scheduling apparatus
23 QoS control apparatus
24 Interface apparatus
25 Management DB
30 Cluster NW
41 Workload management unit
100 Drive device
101 Recording medium
102 Auxiliary storage device
103 Memory device
104 CPU
105 Network interface
211 Traffic quantity prediction unit
212 Bandwidth excess determination unit
213 Learning data DB
214 Prediction parameter management table
215 Threshold information table
221 Schedule calculation unit
222 Cluster management table
231 Command generation unit
232 Past command DB
233 QoS setting information table
B Bus

The invention claimed is:

1. A communication management apparatus comprising:
an acquisition unit, including one or more processors, configured to acquire quantities of traffic of communications performed by one or more communication units operating in each of a plurality of computers constituting a cluster;

a prediction unit, including one or more processors, configured to predict future quantities of traffic of the communications;

an identification unit, including one or more processors, configured to calculate, for each of the computers, a total of the future quantities of traffic of the communication units operating in the computer and identifying a first computer for which the total exceeds a threshold; and a move control unit, including one or more processors, configured to:
control, for a communication unit operating in the first computer, move to a second computer;
predict future quantities of traffic for the computers,
select, among the communication units operating in the first computer, such a communication unit that the future quantity of traffic of the first computer is the closest to an average of the future quantities of traffic of the computers if the communication unit is moved from the first computer, as a target to be moved to the second computer, and
select such a computer that the future quantity of traffic of the computer is the closest to an average of the future quantities of traffic of the computers if the communication unit targeted for the move moves to the computer, as the second computer.

2. The communication management apparatus according to claim 1, further comprising a QoS setting unit, including one or more processors, configured to perform QoS setting to preferentially assign a bandwidth to the communication unit targeted for the move after the move.

3. The communication management apparatus according to claim 1, wherein
the prediction unit is configured to predict a quantity of communication traffic based on correlation between a first type of communications inside the cluster and a second type of communications with terminals outside the cluster according to past communication data.

4. A communication management method, wherein a computer executes:
acquiring quantities of traffic of communications performed by one or more communication units operating in each of a plurality of computers constituting a cluster;
predicting future quantities of traffic of the communications;
calculating, for each of the computers, a total of the future quantities of traffic of the communication units operating in the computer and identifying a first computer for which the total exceeds a threshold;
controlling, for a communication unit operating in the first computer, move to a second computer;
predicting future quantities of traffic for the computers;
selecting, among the communication units operating in the first computer, such a communication unit that the future quantity of traffic of the first computer is the closest to an average of the future quantities of traffic of the computers if the communication unit is moved from the first computer, as a target to be moved to the second computer; and
selecting such a computer that the future quantity of traffic of the computer is the closest to an average of the future quantities of traffic of the computers if the communication unit targeted for the move moves to the computer, as the second computer.

5. The communication management method according to claim 4, further comprising:
performing QoS setting to preferentially assign a bandwidth to the communication unit targeted for the move after the move.

6. The communication management method according to claim 4, further comprising:
predicting a quantity of communication traffic based on correlation between a first type of communications inside the cluster and a second type of communications with terminals outside the cluster according to past communication data.

7. A non-transitory computer readable medium storing a communication management program for enabling a computer to execute:
acquiring quantities of traffic of communications performed by one or more communication units operating in each of a plurality of computers constituting a cluster;
predicting future quantities of traffic of the communications;
calculating, for each of the computers, a total of the future quantities of traffic of the communication units operating in the computer and identifying a first computer for which the total exceeds a threshold;
controlling, for a communication unit operating in the first computer, move to a second computers;
predicting future quantities of traffic for the computers;
selecting, among the communication units operating in the first computer, such a communication unit that the future quantity of traffic of the first computer is the closest to an average of the future quantities of traffic of the computers if the communication unit is moved from the first computer, as a target to be moved to the second computer; and
selecting such a computer that the future quantity of traffic of the computer is the closest to an average of the future quantities of traffic of the computers if the communication unit targeted for the move moves to the computer, as the second computer.

8. The non-transitory computer readable medium according to claim 7, wherein the communication management program further causes the computer to execute:
performing QoS setting to preferentially assign a bandwidth to the communication unit targeted for the move after the move.

9. The non-transitory computer readable medium according to claim 7, wherein the communication management program further causes the computer to execute:
predicting a quantity of communication traffic based on correlation between a first type of communications inside the cluster and a second type of communications with terminals outside the cluster according to past communication data.

* * * * *